United States Patent
Iizuka

(10) Patent No.: US 10,054,246 B2
(45) Date of Patent: Aug. 21, 2018

(54) VALVE WITH LOCKING MECHANISM, AND INTEGRATED VALVE

(71) Applicant: Kitz SCT Corporation, Tokyo (JP)

(72) Inventor: Hisanobu Iizuka, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 15/140,988

(22) Filed: Apr. 28, 2016

(65) Prior Publication Data
US 2016/0356394 A1     Dec. 8, 2016

(30) Foreign Application Priority Data

Jun. 5, 2015   (JP) .................................. 2015-114397

(51) Int. Cl.
*F16K 35/02* (2006.01)
*F16K 31/60* (2006.01)
*F16K 7/16* (2006.01)

(52) U.S. Cl.
CPC .............. *F16K 35/025* (2013.01); *F16K 7/16* (2013.01); *F16K 31/60* (2013.01); *F16K 35/02* (2013.01); *Y10T 137/7256* (2015.04)

(58) Field of Classification Search
CPC ......... Y10T 137/7256; Y10T 137/8225; F16K 35/02; F16K 35/022; F16K 35/10
See application file for complete search history.

(56) References Cited

U.S. PATENT DOCUMENTS 6,463,955 B2 * 10/2002 Hasak ....................... F16K 7/16
                                                                137/553
7,131,629 B2 * 11/2006 Iwabuchi .............. F16K 27/003
                                                                251/33

FOREIGN PATENT DOCUMENTS

| JP | 2005-163949 | 6/2005 |
| JP | 2005-291380 | 10/2005 |
| WO | 2014/062534 | 4/2014 |

OTHER PUBLICATIONS

Machine translation of JP 2005291380.*

* cited by examiner

*Primary Examiner* — Kevin Murphy
(74) *Attorney, Agent, or Firm* — Wenderoth, Lind & Ponack, L.L.P.

(57) ABSTRACT

A valve with a locking mechanism and an integrated valve are provided. The valve includes a handle body having a knob, the handle body being disposed rotatably on top of a valve body housing a valve shaft for opening and closing a valve piece. A cutout stepped face is formed on a part of the outer periphery of the valve body located under the handle body. A locking plate having a locking hole is placed rotatably in the cutout stepped face via a pivotally attaching portion, and when the locking plate is rotated to either a position at which the valve body is in a full-close state or a position at which the valve body is in a full-open state, the locking hole is faced the upper surface area of the valve body to allow locking.

4 Claims, 8 Drawing Sheets

VALVE WITH LOCKING MECHANISM, AND INTEGRATED VALVE

BACKGROUND OF THE INVENTION

1. Technical Field

The present invention relates to a valve with a locking mechanism and to an integrated valve, and, for example, relates to a manual valve with a locking mechanism used for an integrated gas supply system of a semiconductor manufacturing apparatus and to an integrated valve having the manual valve.

2. Description of the Related Art

In a gas supply system of a semiconductor manufacturing apparatus, an integrated valve is used as a gas stick, etc., which is an integrated valve unit having a channel, to which various valves, such as a manual valve, automatic valve, and purging valve, a filter, a regulator, a pressure sensor, a mass-flow controller, etc., are connected in series. Such integrated valves are arranged compactly in parallel with each other to reduce the size of the gas supply system as much as possible.

A manual valve connected to such an integrated valve is usually disposed at the inlet or outlet of the channel of the integrated valve and is opened and closed by a worker's rotating a handle to open and close the channel for a supply gas. The manual valve, therefore, needs a function of certainly locking the handle to prevent the handle in its full-close state from being inadvertently rotated in an opening direction. One example of such a locking mechanism is a locking mechanism with a locking hole, which usually works in such a way that when the handle is in its full-close state, a locking member of a padlock, etc., is fitted in the locking hole of the locking mechanism to prevent the handle from rotating, thereby keep it in the full-close state.

The locking mechanism with the locking hole also needs a function of preventing the worker's misoperation in that the worker mistakenly locks the handle at a position other than its full-close (or full-open) position. Generally, a manual opening/closing mechanism should preferably have the above locking mechanism.

Japanese Laid-Open Patent Application Publication No. 2005-291380, WO 2014/062534, and Japanese Laid-Open Patent Application Publication No. 2005-163949 each propose a valve having a locking mechanism with a locking hole, the locking mechanism having the above misoperation preventing function. JP 2005-291380 describes a manual valve whose valve element moves relative to a valve seat through a screw mechanism, the manual valve having a lock mechanism including a handle having a cutout groove formed on its outer periphery, a fixing groove formed on the valve body, and a plate slidable along the fixing groove and having a lock hole. This locking mechanism works in such a way that when the valve is in its closed state, the plate engages with the fixing groove of the valve body and with the cutout groove of the handle and that a lock member is fitted to the plate in this engaged state to keep the valve in its closed state.

A slide member with a locking hole, which slide member is attached to the top of an actuator and is disposed inside a handle via a supporting point, is shown in drawings (FIGS. 1 to 3) of WO 2014/062534. The Drawings (FIGS. 1 to 3) of WO 2014/062534 depict a lock mechanism working in such a way that when a grip of the slide member, the grip projecting above the handle, is lifted when the handle is in its full-close position, the slide member rotates around the supporting point, which locks the side of handle that is opposite to the supporting point in a recession formed on top of an actuator housing, thus locking the handle.

JP 2005-163949 describes a complex automatic valve having a lock mechanism in a manual operation mechanism unit. The lock mechanism of the manual operation mechanism unit works such a way that a lock engaging portion of a lock plate capable of coming in and out of a valve body is superposed on a lock hole formed on an operating handle (when the operating handle is in its closed state) and that the operating handle is fixed to the valve body using a lock member, such as padlock. Such a lock plate capable of coming in and out of the valve body is disclosed as a lock plate pivotally and rotatably attached to the valve body with a locking pin such that the lock-hole side of the lock plate projects out of the upper surface area of the valve body when the lock plate is rotated, and as a lock plate which has a spring attached to its bottom and is moved up and down by the elastic force of the spring.

Further miniaturization and integration of, for example, a gas supply system of a semiconductor manufacturing apparatus is in demand in recent years. A valve having a locking mechanism with a locking hole, the locking mechanism having the above misoperation preventing function, is in many cases connected to a place where various valve units making up a compact integrated valve are arranged in close formation.

In the structure of the lock mechanism of JP 2005-291380, the plate engages with the fixing groove of the valve body and with the cutout groove of the handle. As a result, in this structure, the plate having the lock hole moves slidably in a state of vertically standing relative to a side face of the valve body. In this structure, therefore, the plate or a frame formed on a housing supporting the plate inevitably projects horizontally from an area above the valve body.

When it is tried to connect a valve unit having a lock mechanism projecting horizontally from the upper surface area of a valve body to a place where valve units making up an integrated valve compactified as much as possible are arranged in close formation, a portion projecting horizontally from an occupied area occupied by the valve unit interferes with an adjacent valve unit, which makes valve connection impossible or limits the place or direction of valve connection. Even if a specific valve unit is free from interference in its connected state, the upper surface area of the valve body should be secured for each valve unit, as the occupied area of each of various valve units connected to the integrated valve. For this reason, a valve unit having a member projecting toward the occupied area of an adjacent valve unit is not preferable as a valve unit connected to the integrated valve.

In the lock mechanism structure of WO 2014/062534, the slide member with the locking hole is disposed in such a way as to slide in the direction of right above the handle, and therefore does not project horizontally from the upper surface area of the valve body, thus not interfering with an adjacent valve unit. However, this slide member is housed in the handle when put in an unlocked position, and is locked by lifting the grip of the slide member projecting above the handle when put in a locked position. This significantly complicates the internal structure of the handle and the structure of the slide member. The lock mechanism of WO 2014/062534 thus requires excessively large manufacturing costs. Because the grip of the slide member constantly projects from the handle, a worker's finger comes in contact with the grip when the worker operates the handle. This results in an unpleasant operation feeling and inferior operability.

According to the lock mechanism of JP 2005-163949, the lock hole formed on the operating handle impairs the operability of the handle and complicates the shape of the handle. When the lock plate is pivotally and rotatably attached to the valve body, rotating the lock plate causes it to project horizontally from the upper surface area of a base, in which case the lock plate may interfere with an adjacent valve unit.

The present invention has been developed in order to solve the above problems, and it is therefore the object of the invention to provide a valve with a locking mechanism and an integrated valve, the valve being structurally compact, not interfering with an adjacent valve unit when the valve is connected to a place where valve units making up an integrated valve are arranged in close formation, being simple in structure and superior in cost performance, not impairing the shape and operability of a handle, and having a misoperation preventing function that allows locking of the handle when the valve is closed or opened on a necessary basis.

SUMMARY OF THE INVENTION

In order to achieve the above object, a first aspect of the present invention provides a valve with a locking mechanism, which valve includes a handle body having a knob, the handle body being disposed rotatably on top of a valve body housing a valve shaft for opening and closing a valve piece. According to the valve, a cutout stepped face is formed on a part of the outer periphery of the valve body located under the handle body, and a locking plate having a locking hole is placed rotatably in the cutout stepped face via a pivotally attaching portion, and when the locking plate is rotated to either a position at which the valve body is in a full-close state or a position at which the valve body is in a full-open state, the locking hole is faced the upper surface area of the valve body to allow locking.

A second aspect of the present invention provides the valve with the locking mechanism in which valve a rotary plate is disposed under the knob of the handle body, the rotary plate rotating within the upper surface area of the valve body, a cutout is formed on a part of the rotary plate in such a way as to allow the locking plate to rotate, and a locking portion is formed on the outer peripheral lower surface of the part of rotary plate other than the cutout and is caused to lock the locking plate when the locking plate is in either a full-close state or full-open state, to prevent the locking plate from rotating.

A third aspect of the present invention provides the valve with the locking mechanism in which valve an enclosure of the valve body is formed into a cylindrical shape, the rotation area of the locking plate is confined to an area almost along the radial direction of the cylindrical enclosure, and a stepped portion of the cutout stepped face serves as a rotation locking surface that prevents the locking plate from rotating when it is in either the full-open state or full-close state.

A fourth aspect of the present invention provides the valve with the locking mechanism in which valve an opening peek is formed on the rotary plate of the handle body to allow an indication portion indicating "full-open" and "full-close", the indication portion being formed on the top face of the valve body, to be visually recognized through the opening peek as a result of the rotation of the rotary plate.

A fifth aspect of the present invention provides an integrated valve including the valves with the locking mechanisms arranged into an integral structure on abase having a channel.

According to the first aspect of the invention, the cutout stepped face is formed on a part of the outer periphery of the valve body and the locking plate is placed in this cutout stepped face. This prevents the locking plate from projecting horizontally from the valve body or moving toward the interior of the valve body, thus offering the compact valve with the locking mechanism that reduces an unnecessary portion of a housing space for the locking plate to the minimum and also offering the handle with better operability. When this valve is connected to a place where valve units making up an integrated valve are arranged in close formation, the valve does not interfere with an adjacent valve unit. In addition, because the locking hole is faced the upper surface area of the valve body to allow locking, a locking member's interfering with an adjacent valve unit, etc., upon locking can be avoided.

The locking plate is disposed on the valve body located below the handle body to be separated therefrom. Providing the locking plate, therefore, hardly exerts an effect on the structure of the handle body, thus not leading to the complication of the structure of the handle body or damage to the operability of the handle.

The locking plate pivotally attached rotatably is guided in its rotation along the cutout stepped face serving as a sliding face for the locking plate. This allows configuring a locking mechanism of a simple structure not requiring any member supporting the slide movement of the locking plate, such as a frame and spring, thus requiring less number of components.

According to the second aspect of the invention, the cutout allowing the rotation of the locking plate is formed on a part of the rotating plate and the outer peripheral lower surface of the part of rotary plate other than the cutout serves as the locking portion. This allows configuring a misoperation preventing mechanism of an extremely simple structure that causes the locking portion to lock the locking plate when the locking plate is in either the full-close state or full-open state to prevent it from rotating, thereby prevents a worker's misoperation when the worker mistakenly locks the locking plate when it is in a state other than the full-close state or full-open state.

According to the third aspect of the invention, the enclosure of the valve body is formed into a cylindrical shape and the rotation area of the locking plate is confined to the area almost along the radial direction of the cylindrical enclosure. As a result, the whole rotation area of the locking plate is located within a square area circumscribing the circular plane shape of the cylindrical enclosure in a plan view, which prevents the locking plate from interfering with an adjacent valve unit and allows the valve to be constructed in a compact manner. This offers a very preferable locking mechanism of a valve unit connected with an integrated valve.

The stepped portion of the cutout stepped face serves as the rotation locking surface that prevents the locking plate from rotating when it is in either the full-open state or full-close state. As a result, the shape of the cutout stepped face can be optimized or minimized so as to match the shape of the locking plate, and when the locking plate is placed in the cutout stepped face, the stepped portion comes in contact with a side face of the locking plate to function as a stopper, thereby ensuring that the locking plate is placed properly in the cutout stepped face.

According to the fourth aspect of the invention, the indication portion seen from the valve's upper surface side, which indication portion is particularly preferable for indicating a state of valve opening or closing of an integrated valve, can be formed in a simple structure in which the opening peek is formed on the rotary plate of the handle body. The opening peek is formed on the handle and indicates the state of opening or closing in interlocking action with a handle operation. A worker, therefore, easily recognizes the state of opening or closing when operating the handle.

According to the fifth aspect of the invention, the valve with the locking mechanism, the valve including the misoperation preventing mechanism that allows locking of the handle only when the valve is closed or opened and that is disposed on the base having the channel, not interfering with an adjacent valve unit when connected to a place where devices making up an integrated valve are arranged in close formation, and not impairing the shape and operability of the handle, makes up an integrated valve used in a gas supply system of a semiconductor manufacturing apparatus.

DETAILED DESCRIPTION OF THE PREFERRED EMBODIMENTS

Figure 1:
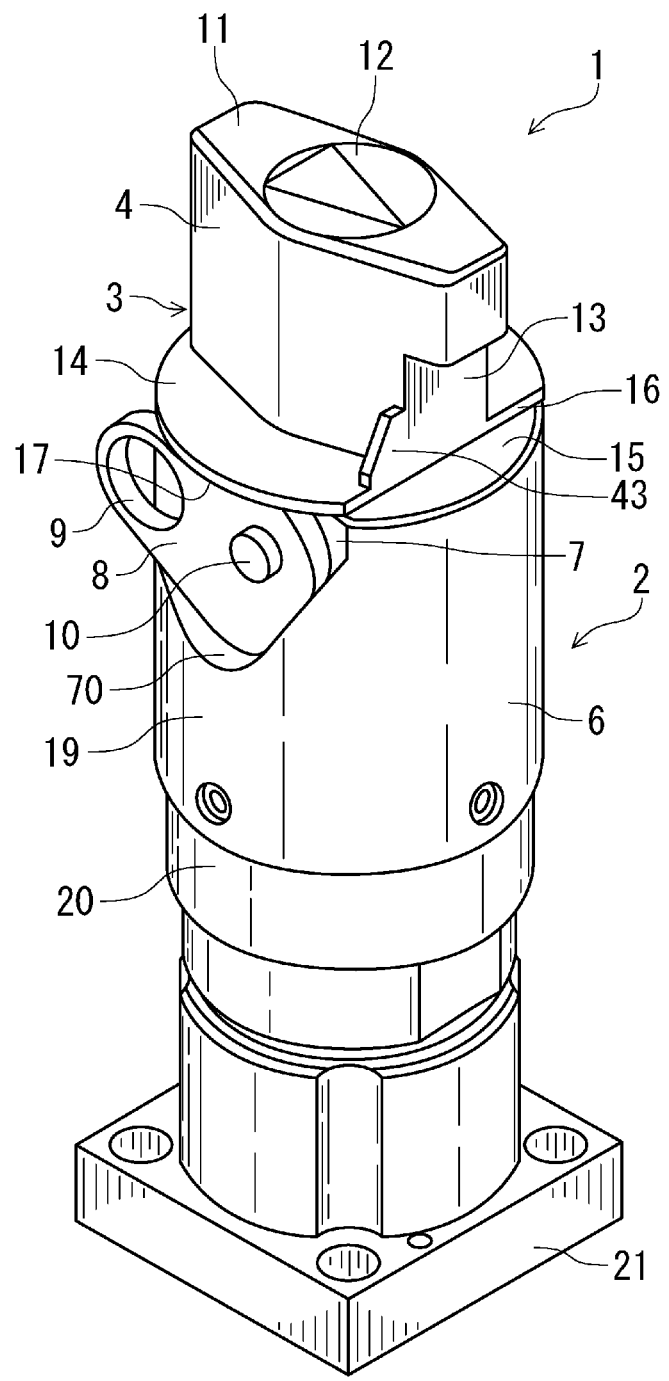
FIG. 1 is a perspective view of a valve with a locking mechanism of the present invention.

An example of embodiments of a valve with a locking mechanism and an integrated valve according to the present invention will now be described in detail, referring to the drawings. The valve with the locking mechanism of the present invention is applied in particular, preferably to an opening/closing manual valve used in a gas supply system of a semiconductor manufacturing apparatus and to an integrated valve including the opening/closing manual valve.

FIG. 1 is a perspective view showing an external view of a valve 1 with a locking mechanism of the present invention, the valve 1 having a handle in its open position (full-open state). On top of a valve body 2, a handle body 3 having a knob 4 is disposed so as to be freely rotatable. The valve body 2 has a valve shaft 29 built therein for opening and closing a valve piece (diaphragm) 26, which will be described later. On apart of the outer periphery 6 of the valve body 2 located below the handle body 3, a cutout stepped face 7 is formed, in which a locking plate 8 having a locking hole 9 is placed rotatably via a pivotally attached portion 10.

Figure 2:
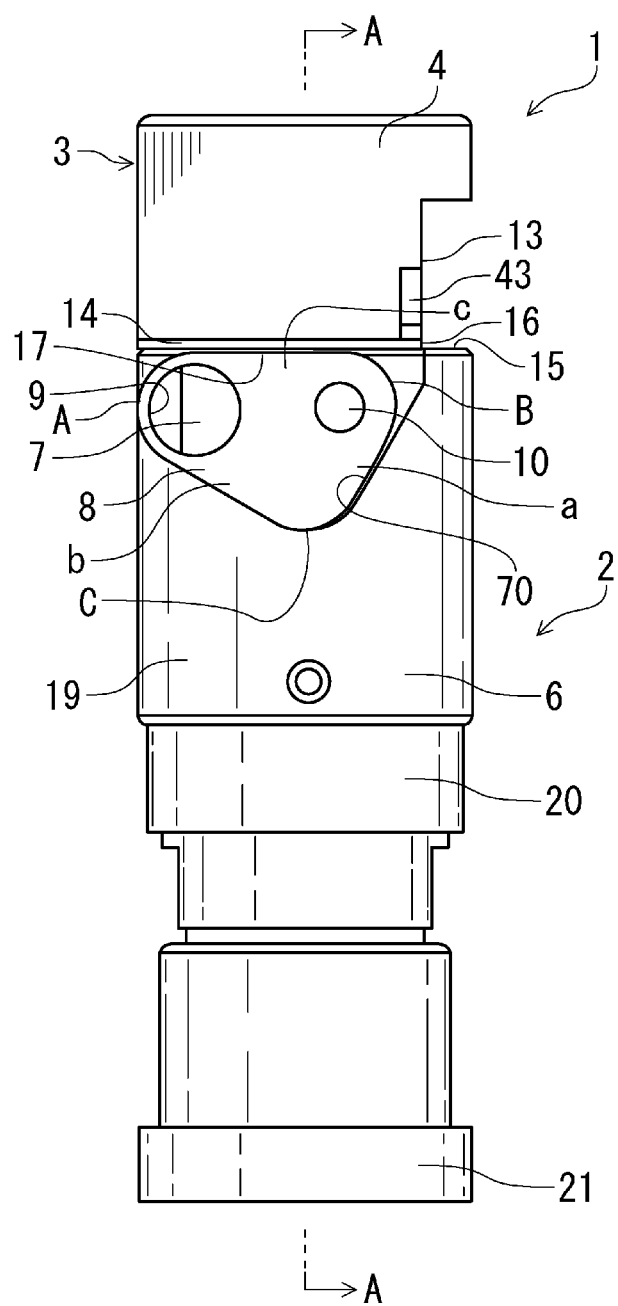
FIG. 2 is a front view of the valve with the locking mechanism of the present invention of FIG. 1.

FIG. 2 is an external front view showing the valve 1 with the locking mechanism of the present invention that is seen in FIG. 1 from a point in front of the locking plate 8.

As shown in FIGS. 1 and 2, the handle body 3 has the knob 4 whose structure is selected properly according to an embodiment. The knob 4 of this embodiment is formed into a hexagonal prism having a top face 11 shaped as a longitudinally elongated hexagon with rounded corners, on which top face 11 a direction indicator 12 indicating the direction of a channel is formed. A plane surface portion 13 is formed on a side in longitudinal direction of the knob 4. This plane surface portion 13 is formed such that it becomes almost flush with a plane surface formed by the cutout stepped face 7 when the handle body 3 is shifted to its closed position.

Figure 4:
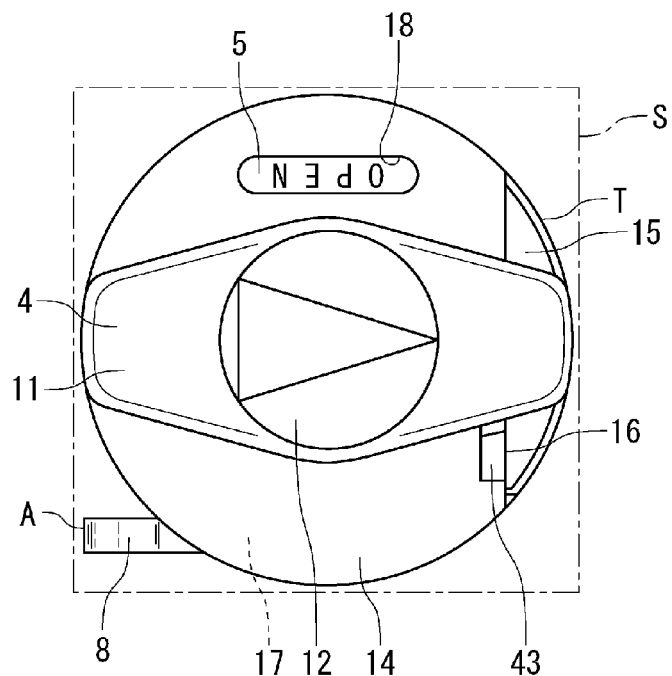
FIG. 4 is an enlarged plan view of the valve with the locking mechanism of the present invention of FIGS. 1 and 2.
Figure 5:
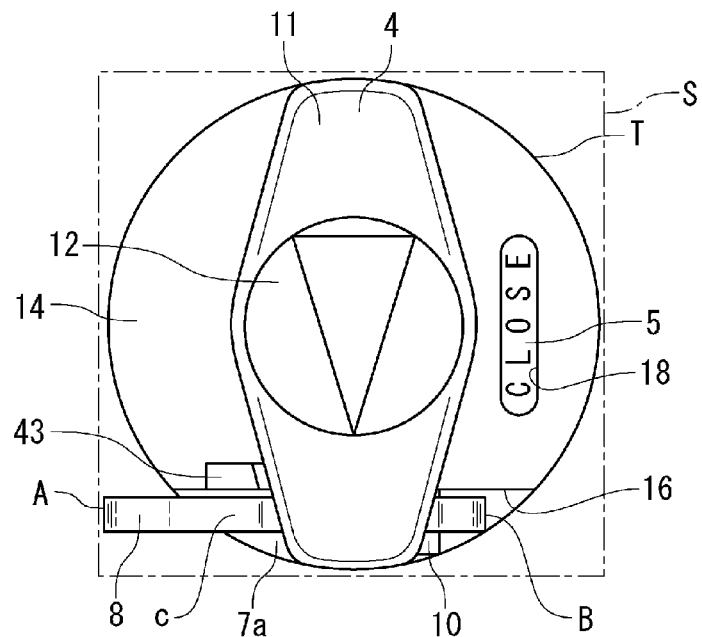
FIG. 5 is an enlarged plan view of the valve with the locking mechanism of the present invention, the valve having the handle body in its closed position and being in a state before being locked by the locking plate.
Figure 6:
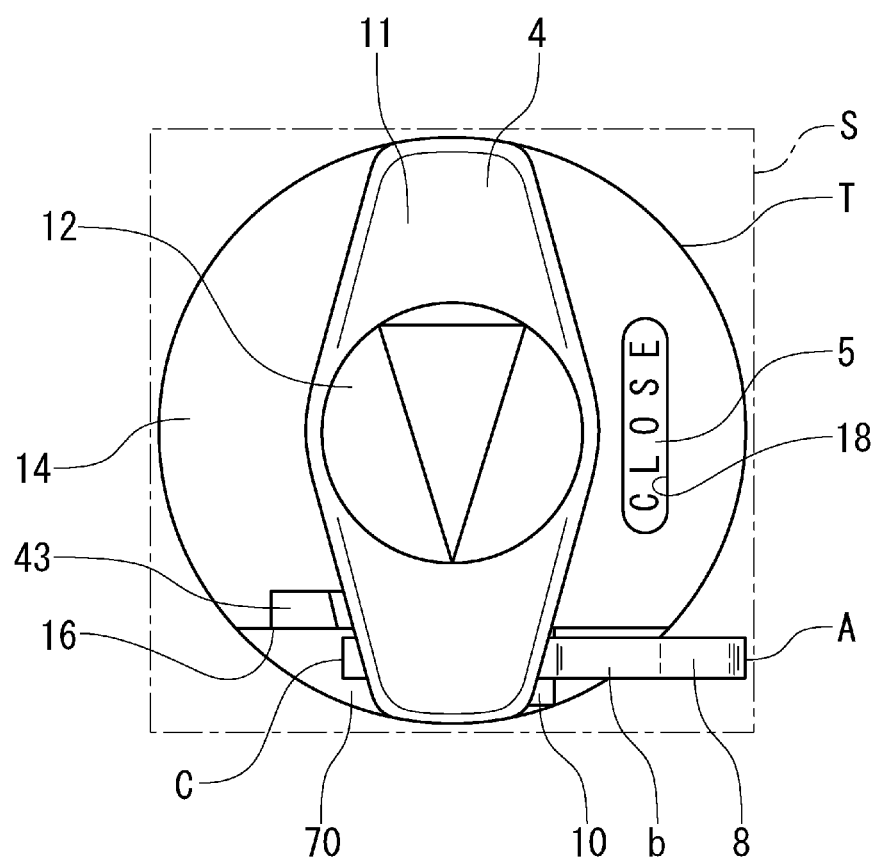
FIG. 6 is an enlarged plan view of the valve with the locking mechanism of the present invention of FIG. 3.

Under the knob 4, a rotary plate 14 that rotates within the upper surface area of the valve body 2 is disposed. As shown in FIG. 1, the rotary plate 14 of this embodiment is of the same circular shape as the upper surface 15 of the valve body 2, and has a cutout 16 formed on a part of the rotary plate 14 such that the cutout 16 allows the rotation of the locking plate 8. The shape of the cutout 16 is selected properly according to an embodiment. In this embodiment, a part of the circular rotary plate 14 is cut out linearly to create the cutout 16, which is formed in such a way as to be almost flush with the plane surface portion 13. The lower surface side of the outer periphery of the part of rotary plate 14 other than the cutout 16 serves as a locking portion 17 for locking the locking plate 8. As shown in FIGS. 4 to 6, an opening peek 18 is formed on the rotary plate 14.

A blocking portion 43 is formed by extending the plane surface portion 13 into a rib connecting aside face of the knob 4 to the upper surface of the rotary plate 14. One surface of the blocking portion 43 connects to the plane surface portion 13 to make up the same plane surface.

As shown in FIGS. 1 and 2, the valve body 2 has an upper enclosure 19 and a lower enclosure 20. A connecting member 21 is a member connecting a base 39 of an integrated valve 40, which will be described later, to the valve body 2. The shape of the enclosures is not limited to a particular shape. According to this embodiment, each of the upper and lower enclosures 19 and 20 is formed into a cylindrical shape. The upper enclosure 19 has the cutout stepped face 7 formed on a part of its outer periphery 6, and the locking plate 8 is placed in the cutout stepped face 7.

The upper surface area of the valve body refers to a space area that is located in the vertical direction of the valve body above a plane area occupied by the valve body in a top plan view of the valve body. The upper surface area of this embodiment is a space area vertically above the almost circular upper surface 15 of the valve body 2 in a plan view of the cylindrical upper enclosure 19.

The structure of the locking plate 8 is not limited to a specific structure except that the locking plate 8 must have the locking hole 9 and be placed rotatably in the cutout stepped face 7 via the pivotally attached portion 10. The structure of the cutout stepped face 7 is also not limited to a specific structure except that the cutout stepped face 7 must allow the locking plate 8 to be placed therein.

Figure 9:
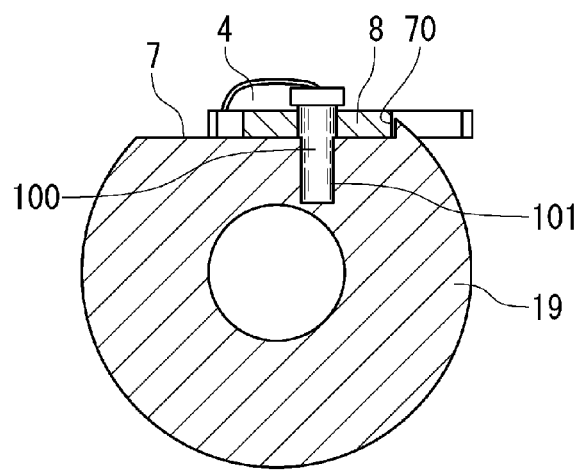
FIG. 9 is a sectional view taken along a C-C line of the valve with the locking mechanism of FIG. 3.

According to this embodiment, the cutout stepped face 7 is connected to the outer periphery 6 of the upper enclosure 19 via the stepped portion 70, which is formed in such a way as to match in shape to the locking plate 8. As shown in FIG. 2, the locking plate 8 is formed such that three arc portions A, B, and C are connected through three linear side faces a, b, and c to make a closed outline, and is fixed rotatably with the pivotally attached portion 10 along the direction of the cutout stepped face 7. The locking member is provided as, for example, a padlock, a wire lock of a given thickness, etc. The locking hole 9 may be selected properly as a hole into which the locking member can be fitted. The locking hole 9 of this embodiment is formed on the arc portion A, where the locking hole 9 is formed into a circle matching in shape to a leg of a padlock. The pivotally attached portion 10 is formed on the arc portion B, where, for example, a pin 100 is press-fitted into the pivotally attached portion 10, as shown in FIG. 9.

The cutout stepped face 7 of this embodiment is almost parallel with the axial direction of the cylindrical upper enclosure 19, has a depth from the outer periphery 6, the depth being larger than the thickness of the locking plate 8 by a given extent, and is formed by cutting out a part of the outer periphery of the upper enclosure 19 such that the resulting cutout extends through to the upper surface 15 of the valve body 2. The cutout stepped face 7 is connected to the outer periphery 6 via the stepped portion 70, which is formed in such a way as to match substantially to a part of the outline of the locking plate 8 when the locking plate 8 is placed in the cutout stepped face 7 (i.e., is in its full-open state), as shown in FIGS. 1 and 2. When the locking plate 8 is placed in the cutout stepped face 7, the lower side faces a and b and the arc portion C of the locking plate 8 are supported by the stepped portion 70 (i.e., are in contact with the stepped portion 70) as the upper side face c is set almost parallel with the locking portion 17 on the lower surface of the rotary plate 14 via a tiny gap, as shown in FIGS. 1 and 2.

In the above manner, the locking plate 8 is placed in the cutout stepped face 7 which has the necessary depth from the outer periphery 6 of the valve body 2, the depth being at least large enough to allow the locking plate 8 of the given thickness to be pivotally attached in the cutout stepped face 7, and is formed substantially along the radial direction of the outer periphery 6. As a result, an unnecessary portion of a housing space for the locking plate 8 is reduced relative to the valve body 2 and therefore the valve 1 is compactified.

A locking action of the valve with the locking mechanism of the present invention will then be described. The locking plate of the present invention faces the locking hole toward the upper surface area of the valve body to allow locking when the valve body is rotated to its full-close or full-open position. In the following description, the locking action of this embodiment is described as the action such that when the valve body 2 is rotated to its full-close position, the locking hole 9 is faced toward the upper surface area of the valve body 2 to allow locking.

FIGS. 1 and 2 depict the locking plate 8 in its housed state (full-open state), showing the locking plate 8 placed in the cutout stepped face 7. The locking portion of the rotary plate of the present invention locks the locking plate to prevent it from rotating when the locking plate is in either the full-open or full-close state. According to this embodiment, the locking plate 8 in its full-open state is locked in such a way that the locking portion 17 on the lower surface of the flange-like rotary plate 14 overhangs the part of cutout stepped face 7 that extends through to the upper surface 15, thus covering the locking plate 8, whose upper side face c is blocked from above by the locking portion 17 and is therefore prevented from rotating upward.

The stepped portion of the cutout stepped face of the present invention serves as a rotation locking surface that prevents the locking plate in its full-open state from rotating. When the locking plate 8 of this embodiment is in its full-open state, the stepped portion 70 supports (comes in contact with) the side faces a and b and arc portion C in such a way as to fit to them, thus serving as the rotating locking surface that locks the locking plate 8 to prevent it from rotating in the opening direction.

Figure 3:
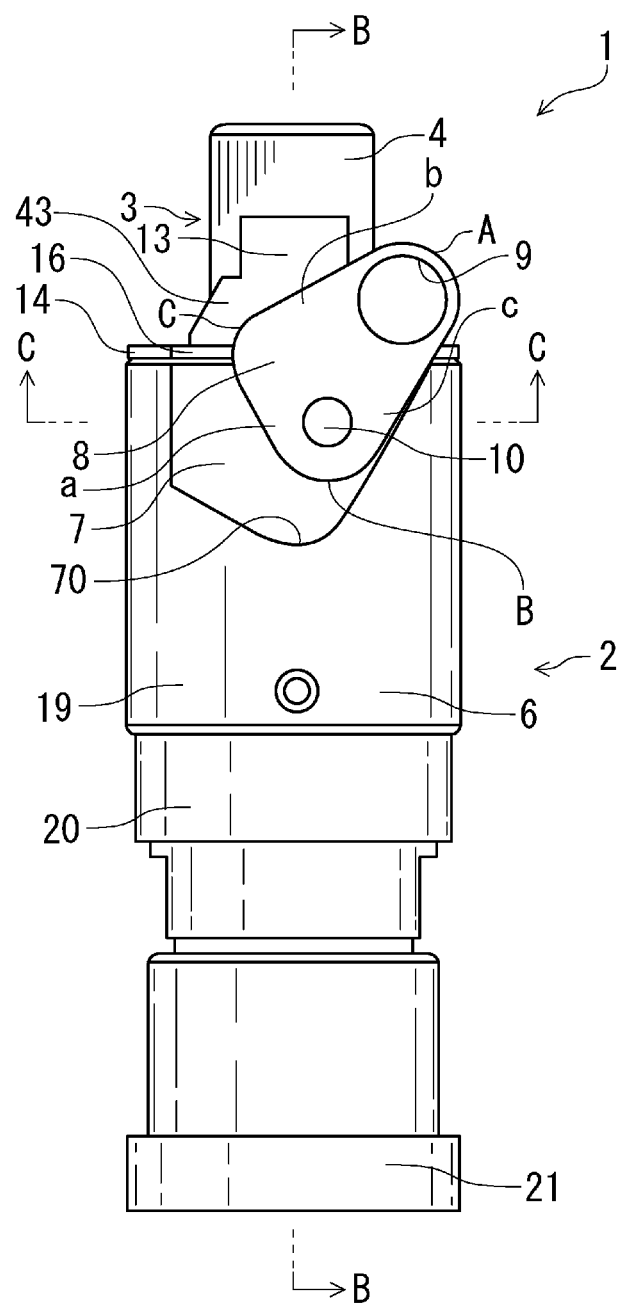
FIG. 3 is a front view of the valve with the locking mechanism of the present invention, the valve having a handle body in its closed position and being locked by a locking plate.

FIG. 3 is a front exterior view of the locking plate 8 seen from a point in front of the locking plate 8, showing a locked state (the locking plate 8 in the full-close state) in which the handle body 3 of this embodiment in the open position shown in FIGS. 1 and 2 is rotated by 90 degrees to the closed position (full-close state), the locking plate 8 is rotated around the pivotally attached portion 10 to the limit of the locking direction to face the locking hole 9 toward the upper surface area of the valve body 2, and the handle body 3 is locked in its closed position.

The cutout of the rotary plate of the present invention is formed to allow the locking plate to rotate. At the closed position of the handle body 3 of this embodiment shown in FIG. 3, the plane surface portion 13 of the knob 4, the cutout 16 of the rotary plate 14, and the cutout stepped face 7 are set almost flush with each other to secure a rotation guide area, in which the part of locking plate 8 that is closer to the locking hole 9 can be rotated slidably around the pivotally attached portion 10 to the upside to the valve body 2.

The cutout 16 does not come in parallel with the cutout stepped face 7 at a position other than the position at which the rotary plate 14 is in its full-close state. Trying to rotate the locking plate 8 when the handle body 3 is in a position other than its full-close position, therefore, ends up in a failure because of the locking plate 8 being blocked by the locking portion 17. This prevents a misoperation in which the locking plate 8 is mistakenly locked when the handle body 3 is in a position other than its full-close position. In this manner, the cutout 16 of this embodiment, in spite of its extremely simple structure given by linearly cutting out a part of the rotary plate 14, certainly prevents a misoperation.

When the locking plate 8 is in its full-close state, as shown in FIG. 3, the whole of the locking hole 9 is above the rotary plate 14 and faces the upper surface area of the valve body 2 in a side view of the valve body 2. As it will be shown later in FIG. 7, a cutout recession 22 is formed on the knob 4 by cutting out a part of handle body 3 that overlaps the circular interior of the locking hole 9 in a side view of the valve body 2. The recession 22 of this embodiment is formed into a cutout of a semicircular section that fits to the circular sectional shape of the locking member (the leg of the padlock). Forming such a recession 22 allows further reducing the size of the locking plate 8.

The stepped portion of the cutout stepped face of the present invention serves as the rotation locking surface when the locking plate is in its full-close state. When the locking plate 8 of this embodiment is in its full-close state, the stepped portion 70 comes in contact with the side face c to function as the rotation locking surface that prevents the locking plate 8 from rotating in the closing direction.

In this manner, the stepped portion 70 is formed to have the shape that matches the shape of the occupation area created by rotation of the locking plate 8 of the given shape and serves as the locking surface that blocks the rotation of the locking plate 8. This reduces the area of the cutout stepped face 7 formed on the outer periphery 6 to the minimum necessary area, thereby optimizes and minimizes the housing space for the locking plate 8, and allows the locking plate 8 to be placed in the cutout stepped face 7 in a stable and secure manner.

According to this embodiment, when the locking plate 8 is shifted to a middle position during its rotation from the full-open position shown in FIGS. 1 and 2 to the full-close position shown in FIG. 3, the locking hole 9 of the locking plate 8 is shifted to a position at which the locking hole 9 faces the upper surface area of the valve body 2. At this middle position, however, the block portion 43 formed on the knob 4 overlaps the locking hole 9, thus blocking the locking member to prevent it from fitting into the locking hole 9. In this manner, the locking member is prevented from being mistakenly fitted into the locking hole 9 at a middle position other than the full-close position of the locking plate 8.

FIGS. 4 to 6 are external plan views showing the valve body 2 of this embodiment seen from the side of upper surface 15, in which plan views the front face of the locking plate 8 is shown as the lower side. FIG. 4 is a plan view of the valve of FIGS. 1 and 2, FIG. 5 depicts a state in which the handle body 3 is in its closed position while the locking plate 8 is in its full-open position, and FIG. 6 is a plan view of the valve of FIG. 3. An almost square area S indicated by a single-dot chain line in those plan views is a square area circumscribing an almost circular area T formed by the upper surface 15 of the cylindrical upper enclosure 19 of the valve body 2 (or by the rotary plate 14 identical in shape with the upper surface 15).

In FIG. 4, the handle body 3 is in its open position, and the direction indicator 12 disposed on the upper surface 11 of the knob 4 indicates the flow direction of the channel as the right direction in FIG. 4.

The opening peek is formed on the rotary plate of the present invention, and an indication portion indicative of "full-open" and "full-close" is formed on the upper surface of the valve body such that "full-open" and "full-close" can be visually recognized through the rotation of the rotary plate. According to this embodiment, the opening peek 18 of a given shape is formed on the rotary plate 14, so that the indication portion 5 indicative of "full-open" formed on the upper surface 15 of the valve body 2 can be visually recognized through the opening peek 18. The indication portion 5 indicative of "full-open" is, therefore, formed at a position at which the opening peek 18 faces the indication portion 5 when the handle body 3 is shifted to its open position. In FIG. 4, for example, characters "OPEN" in a given form are indicated. The location, size, and shape of the opening peek 18 can be selected properly.

FIG. 4 demonstrates that the locking plate 8 is blocked by the locking portion 17 on the lower side of the rotary plate 14. Since the locking plate 8 rotates slidably in the direction perpendicular to the paper surface in FIG. 4, it is understood that the sliding rotation of the locking plate 8 is blocked by the locking portion 17.

FIG. 5 depicts a state in which the handle body 3 is rotated by 90 degrees from the opened position shown in FIG. 4 to the closed position and the locking plate 8 is in its full-open state. The direction indicator 12 indicates the direction toward the lower side of FIG. 5 that is perpendicular to the flow direction of the channel, in which case the indication portion 5 indicative of "full-close" formed on the upper surface 15 of the valve body 2 can be visually recognized through the opening peek 18. In the same manner as the indication portion 5 indicative of "full-open", the indication portion 5 indicative of "full-close" is formed at a position at which the opening peek faces the indication portion 5 when the handle body 3 is in its full-close state. In FIG. 5, for example, characters "CLOSE" in a given form are indicated.

FIG. 5 demonstrates that the linear cutout 16 of the rotary plate 14 is set almost flush with the cutout stepped face 7 to leave the sliding rotation area of the locking plate 8 open.

FIG. 6 depicts a state in which the locking plate 8 in its full-open state of FIG. 5 is rotated slidably to the upside to the valve body 2, into the full-close state. The locking hole 9 located on the left in FIG. 5 is, therefore, located on the right in FIG. 6. FIG. 6 demonstrates that the locking plate 8 locks the cutout 16 to lock the rotary plate 14 (handle body 3) to prevent it from rotating.

The rotation area of the locking plate of the present invention is confined to an area almost along the radial direction of the cylindrical enclosure. According to this embodiment, as shown in FIGS. 2 and 3, the locking plate 8 rotates slidably along the outer periphery 6 of the cylindrical upper enclosure 19 (almost in the radial direction of the upper enclosure 19). As shown in FIGS. 4 to 6, the locking plate 8 rotates within the square area S through its entire rotation from the full-open position to the full-close position. Being within the area S, the rotation area of the locking plate 8 is in the direction of circumscribing the circular area T and has a diameter roughly equal to or slightly smaller than the diameter of the area T. Hence the rotation area of the locking plate 8 is confined to the area almost along the radial direction of the cylindrical upper enclosure 19.

Valve units connected to, for example, an integrated valve of a semiconductor manufacturing apparatus are formed to be as compact as possible to save space, but in the occupied area of each valve unit, space must be used most efficiently without loss. The occupied area of each valve unit, therefore, should certainly be secured. For example, in a 1.125 C-seal integrated gas supply system, a valve unit size of 28.6 mm×28.6 mm is specified as a standard size. Because the occupied area of the valve 1 of this embodiment is at least within the upper surface of the connecting member 21, if the rotation area is within the area almost along the radial direction of the upper enclosure 19, the locking plate 8 at least does not project out to the occupied area of an adjacent valve unit when the valve 1 is connected to the base 39, which will be shown later in FIG. 10. Even if the valve 1 is connected to an arbitrary place of the base 39 and is faced in an arbitrary direction, therefore, the valve 1 does not interfere with an adjacent valve unit.

Figure 7:
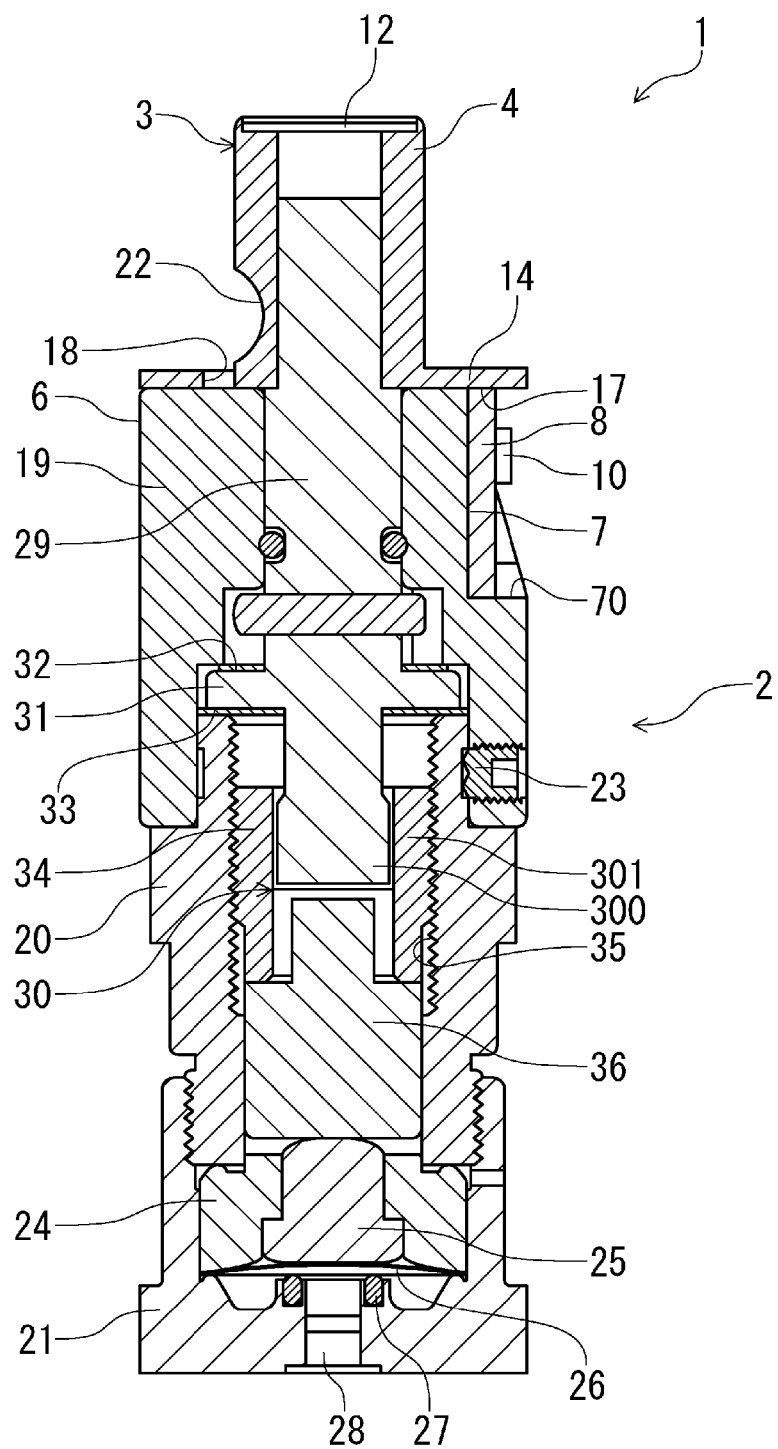
FIG. 7 is a sectional view taken along an A-A line of the valve with the locking mechanism of FIG. 2.
Figure 8:
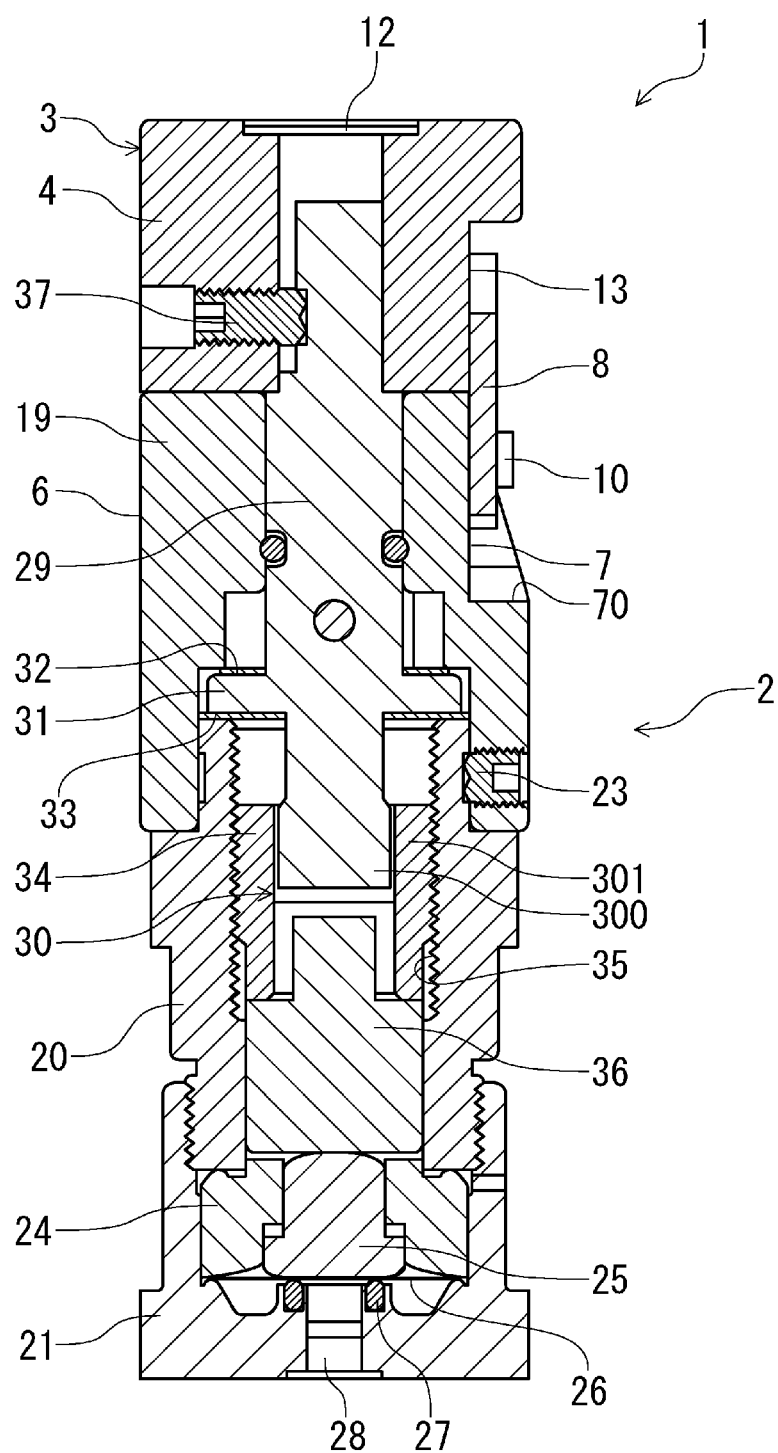
FIG. 8 is a sectional view taken along a B-B line of the valve with the locking mechanism of FIG. 3.

The internal structure and operation of the valve 1 with the locking mechanism of the present invention will then be described. FIG. 7 is a sectional view taken along an A-A line of FIG. 2 showing the handle body 3 in its opened state, and FIG. 8 is a sectional view taken along a B-B line of FIG. 3 showing the handle body 3 in its closed position and the locking plate 8 in its full-close state. The valve 1 with the locking mechanism of the present invention is a diaphragm valve, which will be described below. However, the valve with the locking mechanism of the present invention is not limited to the diaphragm valve, and may be provided as various types of valves connectible to the base 39.

In FIG. 7, the outer structure of the valve body 2 is composed of the upper enclosure 19, the lower enclosure 20, and the connecting member 21. The upper enclosure 19 is fitted on an annular portion on the upper part of the lower enclosure 20 and is fastened with a fastening screw 23 to the lower enclosure 20. The lower enclosure 20 has a male screw formed on its lower end and engaged with a female screw formed on the connecting member 21 and is therefore fixed to the connecting member 21. A bonnet 24 is fitted on the inner periphery of the connecting portion 21 to be fixed thereto. The bonnet 24 guides a pressure member 25 in its upward/downward move. The pressure member 25 presses the diaphragm (valve piece) 26, press-fitting it to the valve seat 27 to seal up the channel 28 of the valve 1.

The handle body 3 is disposed rotatably on top of the valve body 2, and has the knob 4 and the rotary plate 14 under the knob 4. As described above, the knob 4 has the recession 22 of the semicircular section formed by cutting out a part of the knob 4. As shown in FIG. 4, etc., the opening peek 18 is bored into the rotary plate 14. Inside the handle body 3, the valve shaft 29 is fitted pivotally in the axial direction, as a shaft integral to or separated from the handle body 3.

The upper enclosure 19 is below the handle body 3, and has the cutout stepped face 7 formed on the upper part of the outer periphery 6. The locking plate 8 is placed in this cutout stepped face 7, in which the locking plate 8 is fitted rotatably via the pin 100. FIG. 7 depicts a state in which when the valve is in its full-open state, the side face c of the locking plate 8 is blocked by the locking portion 17 of the rotary plate 14 to render the locking plate 8 incapable of rotating, as shown in FIGS. 1 and 2.

The valve shaft 29 rotates slidably along the axis inside the upper enclosure 19 in interlocking move with the handle body 3. The rotation of the handle body 3 is transmitted to a screw member 34 via a coupling mechanism 30 of the valve shaft 29. Bearings are provided properly between a flange 31 of the valve shaft 29 and the upper enclosure 19 and between the flange 31 and the lower enclosure 20, respectively. According to this embodiment, thrust washers 32 and 33 are interposed between the flange 31 and the upper enclosure 19 and between the flange 31 and the lower enclosure 20, respectively.

The coupling mechanism 30 may be any mechanism that couples the valve shaft 29 to the screw member 34 in such away as to convert the rotation of the valve shaft 29 into the screw motion of the screw member 34. According to this embodiment, the coupling mechanism 30 is provided as a serration mechanism in which the valve shaft 29 working as a female-side coupling mechanism 300 and the screw member 34 working as a male-side coupling mechanism 301 engages with each other.

Rotating the handle body 3 in the valve-open state shown in FIG. 7 in the closing direction causes the male-side coupling mechanism 300 of the valve shaft 29 to rotate, which in turn rotates the female-side coupling mechanism 301 of the screw member 34 at a rotation angle almost equal to the rotation angle of the valve shaft 29. As a result, the screw member 34 screws down along the female screw 35 formed on the inner periphery of the lower enclosure 20 to move down inside the lower enclosure 20.

The lower end of the screw member 34 is in contact with a sliding-move member 36 that moves slidably along the inner peripheral surface of the lower enclosure 20. The descending screw member 34, therefore, pushes down the sliding-move member 36. The sliding-move member 36 has a lower end in contact with the upper end of the pressure member 25. The pushed down sliding-move member 36, therefore, pushes down the pressure member 25, which in turn pushes down the diaphragm 26 to press-fit it to the valve seat 27.

FIG. 8 depicts a state of the closed valve in which state the handle body 3 in the state of FIG. 7 is rotated by 90 degrees to press-fit the diaphragm 26 to the valve seat 27. FIG. 8 demonstrates the above described state in which the plane surface portion 13 of the handle body 3 and the cutout stepped face 7 are almost flush with each other. These plane surface portion 13 and cutout stepped face 7 guide the locking plate 8 in its sliding rotation in the rotation area, allowing the locking plate 8 to slide to the upside to the valve 1, where the handle body 3 is locked. In FIG. 8, the screw member 34, sliding-move member 36, and pressure member 25 in the valve-closed state are depicted in their positions of being moved down to an extent of an opening/closing stroke relative to the coupling mechanism 300 of the valve shaft 29. 37 denotes a fastening screw that fastens the valve shaft 29 to the handle body 3.

FIG. 9 is a sectional view taken along a C-C line of FIG. 3 that traverses the pivotally attached portion 10. As shown in FIG. 9, the pivotally attached portion 10 of this embodiment has the pin 100 press-fitted into an engaging portion 101 of the upper enclosure 19, retains strength that the locking plate 8 needs, and is formed into a structure that is simple and space-saving as much as possible. The engaging portion 101 has a size of minimum necessity to the volume of the upper enclosure 19. The pin 100 may be pivotally fitted into the engaging portion 101 by being screwed in.

The valve with the locking mechanism of the present invention may be configured such that the valve can be locked even when the handle body is fully opened. According to this embodiment, the valve 1 may be configured such that FIGS. 1, 2, 4, and 5 depict the full-close state of the handle body 3 of the valve 1 while FIGS. 3 and 6 depict the full-open state of the handle body 3 of the valve 1.

Figure 10:
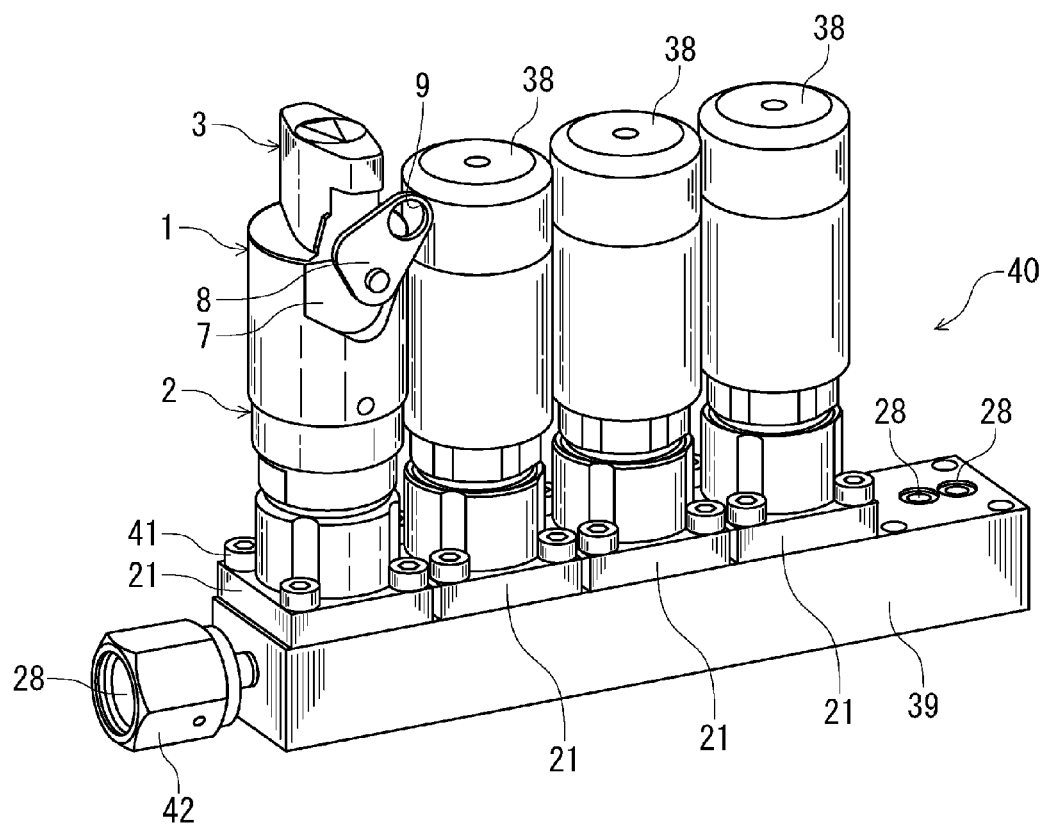
FIG. 10 is an external view showing an example of an integrated valve including the valve with the locking mechanism of the present invention.

FIG. 10 shows an integrated valve 40 including the valves 1 of this embodiment and other valve units 38 that are connected in close formation to the base 39 (integrated valve unit) having the channel 28 via the connecting member 21. The valve units 38 are not limited to such a manual valve as the valve 1 but may be provided as various types of valves connectible to the base 39.

The valve 1 connected to the base 39 shown in FIG. 10 is the valve 1 of this embodiment that is locked in its closed state by the locking plate 8, as shown in FIG. 3. The rectangular connecting member 21 is fixed to the base 39 with bolts 41 on the four corners. 42 denotes a joint to the channel 28, which joint 42 connects the channel 28 to an end of the base 39. For example, in a gas supply system of a semiconductor manufacturing apparatus, etc., a plurality of the integrated valves 40 shown in FIG. 10 are juxtaposed such that they are adjacent and parallel to each other in the longitudinal direction to save space in the system.

As described above, the valve 1 of this embodiment does not interfere with an adjacent valve unit when connected to the base 39, and therefore can be connected with no limitation on the place and location of connection. When a plurality of integrated valves including the juxtaposed valves 1 are lined up horizontally adjacent to each other and respective locking plates 8 of the valves 1 are locked, their locking holes 9 are roughly lined up on straight lines. In such a case, one locking member, such as a bar, is inserted through each locking hole 9 to lock all the lined up valves 1.

The present invention is not limited to the above embodiments and may be modified into various forms of applications on the condition that the modification does not deviate from the substance of the invention described in the claims of the invention.

EXPLANATION OF LETTERS AND NUMERALS

1 Valve with a locking mechanism
2 Valve body

3 Handle body
4 Knob
5 Indication portion
6 Outer periphery
7 Cutout stepped face
70 Stepped portion
8 Locking member
9 Locking hole
10 Pivotally attached portion
100 Pin
13 Plane surface portion
14 Rotary plate
15 Upper surface
16 Cutout
17 Locking portion
18 Opening peek
19 Upper enclosure
20 Lower enclosure
21 Connecting member
22 Recession
26 Valve piece (diaphragm)
27 Valve seat
28 Channel
29 Valve shaft
30 Coupling mechanism
34 Screw member
39 Base
40 Integrated valve
S, T Area

What is claimed is:

1. A valve with a locking mechanism, comprising:
a valve body having an enclosure and housing a valve shaft for opening and closing a valve piece;
a handle body disposed rotatably on top of the valve body, the handle body having a knob;
a plane surface portion being formed on a side in an axial direction of the knob;
a circular shaped rotary plate disposed under the knob, the rotary plate being rotatable within an upper surface area of the valve body;
a cutout formed on a part of the rotary plate;
a locking portion on an outer peripheral lower surface of a part of the rotary plate other than the cutout;
the enclosure being positioned at a lower end of the handle body, the enclosure having a cylindrical shaped outer periphery;
a cutout stepped face being formed in a side face of the enclosure, the cutout stepped face being substantially parallel to an axial direction of the valve body,
a rotatable locking plate having a locking hole; and
a stepped portion being provided in a lower end of the cutout stepped face,
wherein the stepped portion has a first rotation locking surface and a second rotation locking surface, each of which is formed so as to match in shape to the locking plate, and each is formed in a direction inclined respectively to the axial direction of the valve body,
the locking plate is provided rotatably at the cutout stepped face via a pivotal attaching portion, the pivotal attaching portion being provided at an eccentric position to an axial position of the valve body,
the rotation of the locking plate rotates within an area of the cutout stepped face, and is configured such that the rotation of the locking hole is less than 180 degrees,
the locking plate has a first side face and a second side face, the first side face engaging with the first rotation locking surface and the second side face engaging with the second rotation locking surface,
the locking plate is disposed such that when the locking plate is at a full-open position, the locking hole is positioned at an opposite side of the pivotal attaching portion with respect to the axial position of the valve body,
when the handle body is at a closed position, the plane surface portion, the cutout, and the cutout stepped face are set substantially flush with each other along the axial direction of the valve body, and the locking plate is formed such that the locking hole is disposed above the rotary plate to allow locking,
when the handle body is in an open position, the locking plate is blocked by the locking portion of the rotary plate to prevent the locking plate from rotating, and
the first side face of the locking plate at the full-open position is locked by the first rotation locking surface, and the second side face of the locking plate at a full-close position is locked by the second rotation locking surface.

2. The valve with the locking mechanism according to claim 1, wherein an opening peek is bored into the rotary plate of the handle body to allow visual inspection of indication portions indicating "full-open" and "full-close", the indication portions being formed on a top face of the valve body to be visually recognized through the opening peek as a result of rotation of the rotary plate.

3. An integrated valve comprising a plurality of valves with the locking mechanisms according to claim 2, the valves being arranged as an integral structure on a base having a channel.

4. An integrated valve comprising a plurality of valves with the locking mechanisms according to claim 1, the valves being arranged as an integral structure on a base having a channel.

* * * * *